United States Patent
Krieger et al.

(10) Patent No.: US 9,034,944 B2
(45) Date of Patent: May 19, 2015

(54) EMULSION POLYMERS WITH IMPROVED WET SCRUB RESISTANCE HAVING ONE OR MORE SILICON CONTAINING COMPOUNDS

(71) Applicant: CELANESE EMULSIONS GMBH, Sulzbach (Taunus) (DE)

(72) Inventors: Stephan Krieger, Hofheim (DE); Harald Petri, Aarbergen (DE); Kerstin Gohr, Hochheim (DE); Lizandra Belmonte Rodrigues de Castro, Mainz (DE); Hendrikus van Boxtel, Frankfurt am Main (DE)

(73) Assignee: CELANESE EMULSIONS GMBH, Sulzbach (Taunus) (DE)

( * ) Notice: Subject to any disclaimer, the term of this patent is extended or adjusted under 35 U.S.C. 154(b) by 8 days.

(21) Appl. No.: 13/897,563

(22) Filed: May 20, 2013

(65) Prior Publication Data
US 2013/0338253 A1 Dec. 19, 2013

Related U.S. Application Data

(60) Provisional application No. 61/661,517, filed on Jun. 19, 2012.

(51) Int. Cl.
| | | |
|---|---|---|
| C08F 218/08 | (2006.01) | |
| C08K 5/5419 | (2006.01) | |
| C09D 123/08 | (2006.01) | |
| C09D 131/04 | (2006.01) | |
| C08K 5/5415 | (2006.01) | |

(52) U.S. Cl.
CPC ............. *C08K 5/5419* (2013.01); *C08F 218/08* (2013.01); *C09D 123/0853* (2013.01); *C09D 131/04* (2013.01); *C08K 5/5415* (2013.01); *C08L 2201/54* (2013.01)

(58) Field of Classification Search
CPC .. C08K 5/5419; C08K 5/5415; C08F 218/08; C08F 2220/325; C08F 210/02; C09D 123/0853; C09D 131/04
USPC ........... 523/122, 401, 456; 524/650, 730, 731
See application file for complete search history.

(56) References Cited

U.S. PATENT DOCUMENTS

| | | | |
|---|---|---|---|
| 3,755,237 A | 8/1973 | Isaacs et al. | |
| 5,576,384 A | 11/1996 | Nolken et al. | |
| 5,753,733 A | 5/1998 | Eck et al. | |
| 6,087,437 A | 7/2000 | Farwaha et al. | |
| 6,624,243 B2 | 9/2003 | Stark et al. | |
| 8,030,391 B2 | 10/2011 | Petri et al. | |
| 8,436,088 B2 * | 5/2013 | Cabrera et al. ................. | 524/425 |
| 2008/0146730 A1 | 6/2008 | Barfurth et al. | |
| 2009/0203832 A1 | 8/2009 | Muller et al. | |
| 2010/0056696 A1 | 3/2010 | Poole et al. | |
| 2010/0216942 A1 | 8/2010 | Lohmeijer et al. | |
| 2011/0190415 A1 | 8/2011 | Martin et al. | |

FOREIGN PATENT DOCUMENTS

| | | |
|---|---|---|
| EP | 0327376 B1 | 4/1994 |
| EP | 0640629 B1 | 9/1997 |

OTHER PUBLICATIONS

European Search Report issued on Oct. 3, 2013 in a corresponding application EP 13170465.

* cited by examiner

*Primary Examiner* — Nathan M Nutter
(74) *Attorney, Agent, or Firm* — Roberts Mlotkowski Safran & Cole P.C.

(57) ABSTRACT

Aqueous copolymer dispersions for a variety of uses, including coating compositions or binders for plasters and paints, are disclosed. The aqueous copolymer dispersions may comprise one or more silicon containing compounds, in particular hydrolyzable silane compounds without any additional reactive group.

19 Claims, No Drawings

EMULSION POLYMERS WITH IMPROVED WET SCRUB RESISTANCE HAVING ONE OR MORE SILICON CONTAINING COMPOUNDS

CROSS REFERENCE TO RELATED APPLICATIONS

This application claims the benefit of the filing date of U.S. Provisional Application No. 61/661,517 filed Jun. 19, 2012, the entire contents of which are incorporated herein by reference.

FIELD

The present invention relates to aqueous copolymer dispersions of one or more main monomers and one or more hydrolyzable silane compounds without any additional reactive group, e.g., do not contain reactive groups besides the siloxane functionality. The aqueous copolymer dispersions can be used in coating compositions, in particular paints, to improve the wet scrub resistance.

BACKGROUND

Polymer dispersions are well known as binders in the production of coating compositions such as plasters, renders, adhesives, and paints. Advantages of using water borne systems for paints include low cost, ease of application and cleanup, reduced drying times, and low or no odor or emissions of volatile organic compounds (VOC). For interior paints, where good mechanical properties at low binder content are required, wet scrub resistance (WSR) is a critical performance criterion.

To obtain good WSR in emulsion based interior paints, various proposals are described. For instance, U.S. Pat. No. 6,624,243 describes an aqueous dispersion that comprises a hydrolyzable silane compound in combination with glycidyl methacrylate. The hydrolyzable silane compounds include ethylenically unsaturated silane monomers or other reactive silane compounds such as mercapto-, epoxy-, and aminosilanes. EP0327006 describes the use of ethylenically unsaturated silane monomers to improve WSR of low emission interior paints. In addition, EP0640629 describes a polymer modification of carboxylated polymers with epoxy silanes. The silane functionality can be introduced during or after polymerization. EP0327376 discloses a copolymer dispersion that includes a silicon compound having an additional reactive group, for example, a mercapto group, which will be incorporated by a free radical mechanism, or an oxirane, which may react with a carboxyl group of, for example, an acrylic acid comonomer. Preferably the reactive group is an ethylenic double bond.

Besides higher production costs, the functionalized siloxane compounds suggested in the prior art can lead to undesirable side effects. Mercapto groups can reduce the molecular weight of the coating composition by acting as a chain transfer agent. Epoxy groups can lead to reduced storage stability by interactions with other formulation components like for example acrylic thickeners Amino groups can lead to yellowing and affect the pH of the coating composition.

There is therefore a continued need for polymer-based aqueous binder systems that exhibit improved wet scrub resistance.

SUMMARY

In a first embodiment, there is provided an aqueous copolymer dispersion comprising at least one copolymer formed from a mixture comprising (a) one or more main monomers selected from the group consisting of vinyl esters of $C_1$-$C_{18}$ alkanoic acids, vinyl esters of aromatic acids, α-olefins, dienes, esters of ethylenically unsaturated carboxylic acids, vinylaromatics, and vinylhalogenides, (b) from 0.05 to 5% by weight, preferably from 0.1 to 1%, of one or more silicon containing compounds having a formula $(R^1)_n$—Si—$(OR^2)_{4-n}$, wherein n is 0, 1, 2, or 3, and $R^1$ and $R^2$ are each independently a $C_1$-$C_{15}$ alkyl; (c) from 0 to 5% by weight, preferably from 0.5 to 3%, of one or more oxirane or hydroxyl-containing functional monomers; and (d) from 0 to 10% by weight, preferably from 0.05 to 5%, of one or more auxiliary monomers different from (a)-(c); wherein all percents are % by weight based on the total weight of main monomers in the monomer mixture. In one embodiment, the one or more silicon containing compounds (b) are substantially free of any reactive groups selected from the group consisting of mercapto groups, epoxy groups, ethylenically unsaturated groups, glycidyl groups, and amino groups. In one embodiment, there is a weight ratio of one or more silicon containing compounds (b) to the one or more oxirane or hydroxyl functional monomers (c) from 1:2 to 1:20.

In another embodiment, there is provided an aqueous copolymer dispersion comprising at least one copolymer formed from a mixture comprising (a) one or more main monomers selected from the group consisting of vinyl esters of $C_1$-$C_{18}$ alkanoic acids, vinyl esters of aromatic acids, α-olefins, dienes, esters of ethylenically unsaturated carboxylic acids, vinylaromatics, and vinylhalogenides, (b) from 0.05 to 5% by weight, preferably from 0.1 to 1%, of one or more silicon containing compounds having a formula $(R^1)_n$—Si—$(OR^2)_{4-n}$, wherein n is 0, 1, 2, or 3, and $R^1$ and $R^2$ are each independently a $C_1$-$C_{15}$ alkyl; (c) from 0.5 to 3% of one or more oxirane or hydroxyl-containing functional monomers; and (d) from 0 to 10% by weight, preferably from 0.05 to 5%, of one or more auxiliary monomers different from (a)-(c); wherein all percents are % by weight based on the total weight of main monomers in the monomer mixture.

In one embodiment, the one or more main monomers (a) comprise from 60 to 95% of vinyl esters of a $C_1$-$C_{18}$ alkanoic acid, e.g. vinyl acetate, and from 5 to 40% of α-olefins, e.g. ethylene. The one or more main monomers (a) may further comprise vinyl esters of saturated, branched monocarboxylic acids having 9, 10 or 11 carbon atoms in the acid radical.

In one embodiment, the one or more oxirane or hydroxyl-containing functional monomers may comprise hydroxy ethyl methacrylate, glycidyl methacrylate, glycidyl acrylate, allyl glycidyl ether, vinyl glycidyl ether, hydroxy propyl acrylate, hydroxy butyl acrylate, hydroxy ethyl acrylate, hydroxy propyl methacrylate, or mixtures thereof. In one embodiment, the one or more auxiliary monomers may comprise unsaturated sulfonic acids or their salts, ethylenically unsaturated carboxylic acids, ethylenically unsaturated carboxylic acid amides, ethylenically unsaturated phosphonic acids or their salts, acetylacetoxy group containing monomers, ethylenically unsaturated ethylene urea derivatives, or mixtures thereof.

In a further embodiment, there is provided a coating composition comprising at least one filler, at least one pigment, one or more auxiliaries selected from the group consisting of defoamers, surfactants, dispersants, biocides, rheology modifiers, freeze-thaw additives, and thickeners and an aqueous copolymer dispersion. In one embodiment, the weight percentage of the at least one filler is from 30 to 90% of the total composition, the weight percentage of the at least one pigment is from 0.1 to 25% of the total composition, and the weight percentage of the aqueous copolymer dispersion is from 5 to 60% of the total composition, preferably from 5 to 20%. The composition may have a wet scrub class III, II or I according to EN 13300, preferably a wet scrub class II or I according to EN 13300. According to ISO 11998:2006, the coating composition may have a loss of thickness of less than 20 μm after 200 cycles. In addition, the coating composition may have a minimum film forming temperature of less than or equal to 5° C. without addition of film forming agents. The aqueous copolymer dispersion for the coating composition may comprise at least one copolymer formed from a mixture comprising (a) one or more main monomers selected from the group consisting of vinyl esters of $C_1$-$C_{18}$ alkanoic acids, vinyl esters of aromatic acids, α-olefins, dienes, esters of ethylenically unsaturated carboxylic acids, vinylaromatics, and vinylhalogenides, (b) from 0.05 to 5.0% by weight of one or more silicon containing compounds having the formula $(R^1)_n$—Si—$(OR^2)_{4-n}$, wherein n is 0, 1, 2, or 3, and $R^1$ and $R^2$ are each independently a $C_1$-$C_{15}$ alkyl; (c) from 0 to 5% by weight of one or more oxirane or hydroxyl-containing functional monomers; and (d) from 0 to 10% by weight of one or more auxiliary monomers different from (a)-(c), wherein all percents are % by weight based on the total weight of main monomers in the monomer mixture.

DETAILED DESCRIPTION

In general the present invention relates to aqueous copolymer dispersion for use in coating compositions or binders for plasters and paints, such as low emission interior paints or exterior paints or paint formulations having a critical pigment volume concentration. In one embodiment, the aqueous copolymer dispersion comprises at least one copolymer formed from a mixture comprising (a) one or more main monomers, (b) from 0.05 to 5% by weight of one or more silicon containing compounds, in particular hydrolyzable silane compounds without any additional reactive group, (c) from 0 to 5% by weight of one or more oxirane or hydroxyl-containing functional monomers, and (d) from 0 to 10% by weight of one or more auxiliary monomers different from (a)-(c) wherein all percents are % by weight based on the total weight of main monomers in the monomer mixture. Surprisingly it has been found that the use of hydrolyzable silane compounds without any additional reactive group and having the formula $(R^1)_n$—Si—$(OR^2)_{4-n}$, wherein n is 0, 1, 2, or 3, and $R^1$ and $R^2$ are each independently a $C_1$-$C_{15}$ alkyl, added either during or after the polymerization, gives a significant improvement in wet scrub resistance (WSR) without showing any of the disadvantages described above. The inventive aqueous copolymer dispersion comprising hydrolyzable silane compounds without any additional reactive groups may have a very good wet scrub resistance in a variety of paint formulations. These silane compounds can also be used in combination with other functional components such as, for example, GMA, acetoxy functional monomers, hydroxy-functional monomers known to be used in binders for interior paints.

Silicon Containing Compounds (b)

The silicon containing compounds of the present invention are non-functionalized and are substantially free of any reactive groups selected from group consisting of mercapto groups, epoxy groups, ethylenically unsaturated groups, glycidyl groups, and amino groups. In one embodiment, the silicon containing compounds contain none of those reactive groups. The silicon containing compounds have the formula $(R^1)_n$—Si—$(OR^2)_{4-n}$, wherein n is 0, 1, 2, or 3, and $R^1$ and $R^2$ are each independently a $C_1$-$C_{15}$ alkyl and more preferably from $C_1$-$C_6$ alkyl. The alkyl groups may be straight or branched. The alkyl groups contain no unsaturation and are unsubstituted.

In one embodiment, the one or more silicon containing compounds are selected from the group consisting of tetramethoxysilane, tetraethoxysilane, alkyltrimethoxysilane, alkyltriethoxysilane, dialkyldimethoxysilane, dialkyldiethoxysilane, trialkylmethoxysilane, and trialkylethoxysilane. Suitable silicon containing compounds include tetramethoxysilane, tetraethoxysilane, methyltrimethoxysilane, ethyltrimethoxysilane, propyltrimethoxysilane, butyltrimethoxysilane, pentyltrimethoxysilane, hexyltrimethoxysilane, methyltriethoxysilane, ethyltriethoxysilane, propyltriethoxysilane, butyltriethoxysilane, pentyltriethoxysilane, and hexyltriethoxysilane. Preference may be given to tetraethoxysilane, methyltriethoxysilane and hexyltriethoxysilane.

The aqueous emulsion blend may comprise from 0.05 to 5% by weight, e.g., from 0.1 to 1% by weight, of the one or more silicon containing compounds.

The silicon containing compounds of the present invention do not contain ethylenically unsaturated groups and thus the silicon containing compounds are not incorporated into the polymer structure. The silicon containing compounds may be added during polymerization or post polymerization.

Main Monomers (a)

The aqueous copolymer dispersion comprises one or more main monomers selected from the group consisting of vinyl esters of $C_1$-$C_{18}$ alkanoic acids, vinyl esters of aromatic acids, α-olefins, dienes, esters of ethylenically unsaturated carboxylic acids, vinylaromatics, and vinylhalogenides. In one embodiment, the aqueous copolymer dispersion comprises at least one vinyl ester of a $C_1$-$C_{18}$ alkanoic acid and an α-olefin. In one embodiment, the aqueous copolymer dispersion comprises two different vinyl esters of $C_1$-$C_{18}$ alkanoic acids, such as vinyl acetate and vinyl esters of saturated, branched monocarboxylic acids having 9, 10 or 11 carbon atoms in the acid radical, such as versatic acid. In another embodiment, the aqueous copolymer dispersion comprises a vinylaromatic and a diene and/or an ester of ethylenically unsaturated carboxylic acid. In yet another embodiment, the aqueous copolymer dispersion comprises esters of ethylenically unsaturated carboxylic acid.

The aqueous emulsion polymer may comprise from 80 to 99.5% by weight, e.g., from 90 to 95% by weight, of the one or more main monomers.

Exemplary monomers include vinyl esters of alkanoic acids having 1 to 18 carbon atoms. Examples include vinyl esters of carboxylic acids having 1 to 8 carbon atoms, such as, for example, vinyl formate, vinyl acetate, vinyl propionate, vinyl isobutyrate, vinyl pivalate and vinyl 2-ethylhexanoate. Suitable monomers also include vinyl esters of saturated, branched monocarboxylic acids having 9, 10 or 11 carbon atoms in the acid radical, e.g., versatic acid, and vinyl esters of relatively long-chain, saturated and unsaturated fatty acids, for example vinyl esters of fatty acids having 8 to 18 carbon atoms, such as, for example, vinyl laurate and vinyl stearate. Vinyl acetate, vinyl esters of versatic acid and vinyl laurate are preferred. Vinyl acetate is particularly preferred.

Exemplary vinyl esters of aromatic acids include esters of benzoic acid, 4-tert-butylbenzoic acid, or mixtures thereof. Thus, vinyl esters may include vinyl formate, vinyl acetate, vinyl propionate, vinyl isobutyrate, vinyl pivalate, vinyl 2-ethylhexanoate, vinyl laurate, vinyl stearate, vinyl ester of versatic acid, vinyl benzoate, 4-tert-butyl-vinyl benzoate or mixtures thereof.

Suitable α-olefins or diene monomers preferably have from 2 to 6 carbon atoms, and may include ethylene, propylene, isopropylene, n-butene, n-pentene, 1,3-butadiene, or mixtures thereof.

Suitable vinylhalogenides include vinyl fluoride, vinylidene fluoride, vinyl chloride, vinylidene chloride, and vinyl bromide.

Examples of suitable monomers of esters of ethylenically unsaturated carboxylic acids have 3 to 12 carbon atoms, such as esters of acrylic acid, methacrylic acid, crotonic acid, maleic acid, itaconic acid and fumaric acid. Preferred esters of α,β-unsaturated carboxylic acids include alkyl(meth)acrylates (i.e. alkyl esters of acrylic acid or of methacrylic acid). Examples of these are methyl acrylate, ethyl acrylate, propyl acrylate, butyl acrylate, 2-ethylhexyl acrylate, methyl methacrylate, ethyl methacrylate, propyl methacrylate, n-butyl methacrylate, tert-butyl methacrylate, isobutyl methacrylate, 2-ethylhexyl methacrylate, cyclohexyl methacrylate, cyclohexyl acrylate. Examples of esters of unsaturated dicarboxylic acids are dibutyl maleate and monooctylmaleate. These esters can be used alone or in the form of a combination of two or more esters.

Examples of suitable monomers of vinylaromatics include styrene, vinyltoluene and alpha-methylstyrene. Styrene is particularly preferred, and may be used in combination with 1,3-butadiene.

In one preferred embodiment, the one or more main monomers comprise a vinyl ester-ethylene copolymer such as a vinyl acetate-ethylene copolymer, or a copolymer of vinyl acetate, ethylene and a vinyl ester of a branched carboxylic acid having 9 or 10 carbon atoms (VeoVa™ 9, VeoVa™ 10). The one or more main monomers may comprise from 60 to 95% of vinyl esters of a $C_1$-$C_{18}$ alkanoic acid and from 5 to 40% of α-olefins. In one embodiment, the one or more momoners may comprises from 60 to 95% vinyl acetate, e.g., from 60 to 75% vinyl acetate, and from 5 to 40% ethylene, e.g., from 5 to 25% ethylene. When a third co-monomer is employed, such as a vinyl ester of a branched carboxylic acid having 9 or 10 carbon atoms, the one or more main monomers may comprises from 1 to 20% of the third co-monomer.

Functional Monomers (c)

In one embodiment, the aqueous copolymer dispersions of the present invention may further comprise one or more oxirane or hydroxyl functional monomers. In one embodiment, the oxirane or hydroxyl functional monomers are ethylenically unsaturated compounds. Suitable functional monomers may comprise hydroxy ethyl methacrylate, glycidyl methacrylate, glycidyl acrylate, allyl glycidyl ether, vinyl glycidyl ether, hydroxy propyl acrylate, hydroxy butyl acrylate, hydroxy ethyl acrylate, or hydroxy propyl methacrylate. More preferably, the oxirane functional monomer may comprise glycidyl methacrylate, glycidyl acrylate, allyl glycidyl ether, or vinyl glycidyl ether.

The aqueous copolymer dispersions may comprise from 0 to 5% by weight, e.g., from 0.05 to 5% by weight or from 0.5 to 3% by weight, of the one or more oxirane or hydroxyl functional monomers. The weight ratio of one or more silicon containing compounds to the one or more oxirane or hydroxyl functional monomers is preferably from 1:2 to 1:20.

Auxiliary Monomers (d)

In some embodiments, the aqueous copolymer dispersions of the present invention may further comprise one or more auxiliary monomers. Preferably, the auxiliary monomers are different from the other monomers of the aqueous copolymer dispersion. In one embodiment, the aqueous copolymer dispersion comprises from 0 to 10% by weight auxiliary monomers, e.g., from 0.3 to 10% by weight or from 0.5 to 5% by weight.

The one or more auxiliary monomers may be selected from the group consisting of unsaturated sulfonic acids or their salts, ethylenically unsaturated carboxylic acids, ethylenically unsaturated carboxylic acid amides, ethylenically unsaturated phosphonic acids or their salts, acetylacetoxy group containing monomers, and ethylenically unsaturated ethylene urea derivatives.

Exemplary auxiliary monomers of unsaturated sulfonic acids or their salts may include vinylsulfonic acid, 2-acrylamido-2-methylpropanesulfonic acid, 2-acryloyloxy and 2-methacryloyloxyethanesulfonic acid, 3-acryloyloxy- and 3-methacryloyloxypropanesulfonic acida and vinylbenzenesulfonic acid. Exemplary auxiliary monomers of ethylenically unsaturated phosphonic acids or their salts, include vinylphosphonic acid. In addition to said acids, it is also possible to use salts thereof, preferably alkali metal salts thereof or ammonium salts thereof and in particular sodium salts thereof, such as, for example, the sodium salts of vinylsulfonic acid and of 2-acrylamidopropanesulfonic acid.

Exemplary auxiliary monomers of esters of ethylenically unsaturated carboxylic acids include esters of acrylic acid, methacrylic acid, crotonic acid, maleic acid, itaconic acid, citraconic acid and fumaric acid. Preferred esters of α,β-unsaturated carboxylic acids include alkyl(meth)acrylates (i.e. alkyl esters of acrylic acid or of methacrylic acid). Examples of these are methyl acrylate, ethyl acrylate, propyl acrylate, butyl acrylate, 2-ethylhexyl acrylate, methyl methacrylate, ethyl methacrylate, propyl methacrylate, n-butyl methacrylate, tert-butyl methacrylate, isobutyl methacrylate, 2-ethylhexyl methacrylate, cyclohexyl methacrylate and cyclohexyl acrylate. These alkyl esters can be used alone or in the form of a combination of two or more esters.

Exemplary auxiliary monomers of amides of ethylenically unsaturated carboxylic acids include methacrylamide, acrylamide, crotonamide, the mono- or diamide of fumaric acid, the mono- or diamide of maleic acid, the mono- or diamide of itaconic acid and the mono- or diamide of citraconic acid. In addition to the amides, it is also possible to use the N-functionalized derivatives thereof, such as N-alkyl- or N,N-dialkylamides. The unfunctionalized derivatives are preferred.

Exemplary auxiliary monomers of acetylacetoxy group containing monomers include allyl acetoacetate, acetylacetoxyethyl methacrylate, and acetylacetoxybutyl methacrylate.

Exemplary auxiliary monomers of ethylenically unsaturated ethylene urea derivatives include N-vinyl- and N-allylurea and derivatives of imidazolidin-2-one, such as, for example, N-vinyl- and N-allylimidazolidin-2-one, N-vinyloxyethylimidazolidin-2-one, N-(2-(meth)acrylamidoethyl)imidazolidin-2-one, N-(2-(meth)acryloxyethyl)imidazolidin-2-one and N-(2-(meth)acryloxyacetamidoethyl)imidazolidin-2-one. Other derivatives of urea or imidazolidin-2-one may also be used.

Stabilization System

Both during polymerization and thereafter, the copolymer dispersion used to prepare the aqueous compositions that form the coating composition is stabilized in the form of an aqueous copolymer dispersion or latex. The copolymer dispersion therefore will be prepared in the presence of and will contain a stabilization system which generally comprises emulsifiers, in particular nonionic emulsifiers and/or anionic emulsifiers and or protective colloids. Mixtures of the different stabilizers can also be employed.

The amount of emulsifier employed will generally be at least 0.5 wt. %, based on the total quantity of main co-monomers in the copolymer dispersion. Generally emulsifiers can be used in amounts up to about 8 wt. %, based on the total quantity of main monomers in the copolymer dispersion. The weight ratio of nonionic to anionic emulsifiers may fluctuate within wide ranges, between 1:1 and 50:1 for example. Emulsifiers employed with preference herein are nonionic emulsifiers having alkylene oxide groups and/or anionic emulsifiers having sulfate, sulfonate, phosphate and/or phosphonate groups. Such emulsifiers, if desired, can be used together with molecularly or dispersely water-soluble polymers, preferably together with polyvinyl alcohol. Preferably also the emulsifiers used contain no alkylphenolethoxylates (APEO).

Examples of suitable nonionic emulsifiers include acyl, alkyl, oleyl, and alkylaryl ethoxylates. These products are commercially available, for example, under the name Genapol®, Lutensol® or Emulan®. They include, for example, ethoxylated mono-, di-, and tri-alkylphenols (EO degree: 3 to 50, alkyl substituent radical: $C_4$ to $C_{12}$) and also ethoxylated fatty alcohols (EO degree: 3 to 80; alkyl radical: $C_8$ to $C_{36}$), especially $C_{10}$-$C_{14}$ fatty alcohol (3-40) ethoxylates, $C_{11}$-$C_{15}$ oxo-process alcohol (3-40) ethoxylates, $C_{16}$-$C_{18}$ fatty alcohol (11-80) ethoxylates, $C_{11}$ oxo-process alcohol (3-40) ethoxylates, $C_{13}$ oxo-process alcohol (3-40) ethoxylates, polyoxyethylenesorbitan monooleate with 20 ethylene oxide groups, copolymers of ethylene oxide and propylene oxide having a minimum ethylene oxide content of 10% by weight, the polyethylene oxide (4-40) ethers of oleyl alcohol, and the polyethene oxide (4-40) ethers of nonylphenol. Particularly suitable are the polyethylene oxide (4-40) ethers of fatty alcohols, more particularly of oleyl alcohol, stearyl alcohol or $C_{11}$ alkyl alcohols.

The amount of nonionic emulsifiers used in preparing the copolymer dispersions herein is typically about 1% to about 8% by weight, preferably about 1% to about 5% by weight, more preferably about 1% to about 4% by weight, based on the total main monomer quantity. Mixtures of nonionic emulsifiers can also be employed.

Examples of suitable anionic emulsifiers include sodium, potassium, and ammonium salts of linear aliphatic carboxylic acids of chain length $C_{12}$-$C_{20}$, sodium hydroxyoctadecanesulfonate, sodium, potassium, and ammonium salts of hydroxy fatty acids of chain length $C_{12}$-$C_{20}$ and their sulfonation and/or sulfation and/or acetylation products, alkyl sulfates, including those in the form of triethanolamine salts, alkyl($C_{10}$-$C_{20}$) sulfonates, alkyl($C_{10}$-$C_{20}$) arylsulfonates, and their sulfonation products, lignosulfonic acid and its calcium, magnesium, sodium, and ammonium salts, resin acids, hydrogenated and dehydrogenated resin acids, and their alkali metal salts, dodecylated sodium diphenyl ether disulfonate, sodium lauryl sulfate, sulfated alkyl or aryl ethoxylate with EO degree between 1 and 10, for example ethoxylated sodium lauryl ether sulfate (EO degree 3) or a salt of a bis-ester, preferably of a bis-$C_4$-$C_{18}$ alkyl ester, of a sulfonated dicarboxylic acid having 4 to 8 carbon atoms, or a mixture of these salts, preferably sulfonated salts of esters of succinic acid, more preferably salts, such as alkali metal salts, of bis-$C_4$-$C_{18}$ alkyl esters of sulfonated succinic acid, or phosphates of polyethoxylated alkanols or alkylphenols.

The amount of anionic emulsifiers used can typically range from about 0.1% to about 3.0% by weight, preferably from about 0.1% to about 2.0% by weight, more preferably from about 0.5% to about 1.5% by weight, based on the total main monomer quantity. Mixtures of anionic emulsifiers can also be employed.

Along with emulsifiers, the aqueous copolymer dispersions employed in accordance with the present development will also comprise as part of the stabilizer system a selected type of protective colloid based on cellulose ethers, poly vinyl alcohol, poly vinyl pyrolidone, polyacrylic acid, maleic acid styrene copolymers or other water soluble polymers. Suitable protective colloids used in the copolymer dispersions herein include water-soluble or water-dispersible polymeric modified natural substances based on cellulose ethers. Such cellulose ethers have a viscosity, when tested as a 1 wt. % aqueous in water at 25° C., of 5 to 5,000 mPas, preferably of 10 to about 1,500 mPas, more preferably 10 to 500 mPas. Mixtures of celluloses ethers may be used to achieve these viscosity values. Examples of suitable cellulose ether materials include methyl cellulose, hydroxyethyl cellulose, hydroxypropyl cellulose, hydroxypropyl methyl cellulose, ethyl hydroxyethyl cellulose, methyl hydroxyethyl cellulose and combinations of these cellulose ethers. Hydroxyethyl cellulose (HEC), which is commercially available under the tradename Natrosol™, is most preferred.

Hydrophobically modified cellulose ethers may also be employed as the protective colloid in the copolymer dispersions herein. Such materials comprise cellulose ethers which have been hydrophobically modified with long chain hydrocarbon groups to reduce their water solubility. Hydrophobically modified cellulose ethers of this type are those described, for example, in U.S. Pat. Nos. 4,228,277; 4,352,916 and 4,684,704; all of which patents are incorporated herein by reference.

The protective colloids can be used individually or in combination. In the case of combinations, the two or more colloids can each differ in their molecular weights or they can differ in their molecular weights and in their chemical composition, such as the degree of hydrolysis, for example.

The preferred protective colloid is polyvinyl alcohol. Suitable polyvinyl alcohol has degrees of hydrolysis of from 60 to 100 mol % and viscosities of the 4% aqueous solutions at 20° C. of 2-70 mPa*s, especially from 4 to 40 mPa*s.

When protective colloids are used, the amount thereof, based on the total amount of monomers used, is typically from 0.1 to 5 parts by weight, preferably from 0.3 to 5 parts by weight.

In a preferred variant, the present dispersions contain no protective colloid at all, or the amount of protective colloid, based on the total amount of monomers used, is less than 1% by weight, more preferably less than 0.7% by weight.

In addition to the emulsifiers and protective colloids that are used during the emulsion polymerization of the copolymers herein, it is also possible to add further emulsifiers, protective colloids and/or other stabilizers after the polymerization.

Copolymer Dispersion Preparation

The copolymer dispersions comprising the aqueous copolymers described herein can be prepared using emulsion polymerization procedures which result in the preparation of polymer dispersions in aqueous latex form. Such preparation of aqueous polymer dispersions of this type is well known and has already been described in numerous instances and is therefore known to the skilled artisan. Such procedures are described, for example, in U.S. Pat. No. 5,849,389, and in the *Encyclopedia of Polymer Science and Engineering*, Vol. 8, p. 659 (1987), the disclosures of both of these publications are incorporated herein by reference in their entirety.

The polymerization may be carried out in any manner known per se in one, two or more stages with different monomer combinations, giving polymer dispersions having particles with homogeneous or heterogeneous, e.g., core shell or hemispheres, morphology. Any reactor system such as batch, loop, continuous, cascade, etc, may be employed.

The polymerization temperature generally ranges from 20° C. to 150° C., more preferably from 50° C. to 120° C. The polymerization generally takes place under pressure if appropriate, preferably from 2 to 150 bar, more preferably from 5 to 100 bar.

The copolymerisation can be undertaken by batch, semi batch or continuous emulsions polymerization, i.e. by processes in which all the monomer is added upfront or by monomer slow add processes.

In a typical polymerization procedure involving, for example, aqueous copolymer dispersions, monomers, such as vinyl acetate, ethylene, and other monomers, can be polymerized in an aqueous medium under pressures up to 120 bar in the presence of one or more initiators, at least one emulsifying agent and a protective colloid component. The aqueous reaction mixture in the polymerization vessel can be maintained by a suitable buffering agent at a pH of about 2 to about 7.

The manner of combining the several polymerization ingredients, i.e. emulsifiers, monomers, initiators, protective colloids, etc., can vary widely. Generally an aqueous medium containing at least some of the emulsifier(s) can be initially formed in the polymerization vessel with the various other polymerization ingredients being added to the vessel thereafter.

Monomers can be added to the polymerization vessel continuously, incrementally or as a single charge addition of the entire amounts of co-monomers to be used. Co-monomers can be employed as pure monomers or can be used in the form of a pre-mixed emulsion. Ethylene as a co-monomer can be pumped into the polymerization vessel and maintained under appropriate pressure therein.

It is also possible to start the emulsion polymerization using a seed latex, for example with about 0.5 to about 15% by weight of the dispersion.

As noted, the polymerization of the ethylenically unsaturated monomers will generally take place in the presence of at least one initiator for the free-radical polymerization of these co-monomers. Suitable initiators for the free-radical polymerization, for initiating and continuing the polymerization during the preparation of the dispersions, include all known initiators which are capable of initiating a free-radical, aqueous polymerization in heterophase systems. These initiators may be peroxides, such as alkali metal and/or ammonium peroxodisulfates, organic hydroperoxides, more particularly water-soluble ones, or azo compounds, more particularly water-soluble azo compounds.

As polymerization initiators, it is also possible to use what are called redox initiators. Examples thereof are peroxodisulfates, tert-butyl hydroperoxide and/or hydrogen peroxide in combination with reducing agents, such as with sulfur compounds, an example being the sodium salt of hydroxymethanesulfinic acid, Bruggolite® FF6 and FF7, Rongalit C, sodium sulfite, sodium disulfite, sodium thiosulfate, and acetone-bisulfite adduct, or with ascorbic acid, sodium erythorbate, tartaric acid, or with reducing sugars.

The amount of the initiators or initiator combinations used in the process varies within what is usual for aqueous polymerizations in heterophase systems. In general the amount of initiator used will not exceed 5% by weight, based on the total amount of the co-monomers to be polymerized. The amount of initiators used, based on the total amount of the co-monomers to be polymerized, is preferably 0.05% to 2.0% by weight.

In this context, it is possible for the total amount of initiator to be included in the initial charge to the reactor at the beginning of the polymerization. More preferably, a portion of the initiator is included in the initial charge, and the remainder is added after the polymerization has been initiated, in one or more steps or continuously. The addition may be made separately or together with other components, such as emulsifiers or monomer emulsions. The molecular weight of the various copolymers in the copolymer dispersions herein can be adjusted by adding small amounts of one or more molecular weight regulator substances. These regulators are generally used in an amount of up to 2% by weight, based on the total co-monomers to be polymerized. As regulators, it is possible to use all of the substances known to the skilled artisan. Preference is given, for example, to organic thio compounds, silanes, allyl alcohols, and aldehydes.

Following polymerization, the solids content of the resulting aqueous copolymer dispersions can be adjusted to the level desired by the addition of water or by the removal of water by distillation. Generally, the desired level of polymeric solids content after polymerization is from about 40 weight percent to about 70 weight percent based on the total weight of the polymer dispersion, more preferably from about 45 weight percent to about 55 weight percent.

Coating Compositions

The aqueous copolymer dispersion described herein is particularly useful as binder for coatings with low emission regarding Total Volatile Organic Compound (TVOC) and Total Semi Volatile Organic Compound (TsVOC) content. A volatile organic compound is defined herein as a carbon containing compound that has a boiling point below 250° C. (according to the ISO 11890-2 method for polymer dispersions TVOC content determination) at atmospheric pressure while sVOC compounds have a boiling point above 250° C. (like for example common plastisizers). Compounds such as water and ammonia are excluded from VOCs. Another method to determine the VOC/sVOC content of coatings is ISO 16000-9 (chamber measurement).

Coatings prepared with the aqueous copolymer dispersions described herein will generally contain less than 1000 ppm TVOC and TsVOC by weight based on the total weight of the coating. Where appropriate, the aqueous copolymer dispersions used herein can also optionally comprise a wide variety of conventional additives, such as fillers, pigments, and auxiliaries including defoamers, surfactants, dispersants, biocides, rheology modifiers, freeze-thaw additives, formaldehyde scavenger like urea, complexing agents like EDTA or thickeners, which are typically used in the formulation of binders and/or adhesives. Such optional additives may be present in the copolymer dispersion from the beginning of or during polymerization, may be added to the dispersion postpolymerization or, such as in the case of fillers, may be used in connection with preparation of the aqueous coating compositions from the copolymer dispersions as hereinafter described.

In one embodiment, conventional optional additives for the copolymer dispersions herein can include, for example, film-forming assistants, such as white spirit, Texanol®, TxiB®, butyl glycol, butyl diglycol, butyl dipropylene glycol, and butyl tripropylene glycol; wetting agents, such as AMP 90®, TegoWet.280®, Fluowet PE®; defoamers, such as mineral oil defoamers or silicone defoamers; UV protectants, such as Tinuvin 1130®; agents for adjusting the pH; preservatives; plasticizers, such as dimethyl phthalate, diisobutyl phthalate, diisobutyl adipate, Coasol B®, Plastilit 3060®, and Triazetin®; subsequently added stabilizing polymers, such as polyvinyl alcohol or additional cellulose ethers; and other additives and auxiliaries of the kind typical for the formulation of binders and adhesives. The amounts of these additives used in the aqueous copolymer dispersions herein can vary within wide ranges and can be selected by the specialist in view to the desired area of application. The preferred embodiment does not contain any film coalescing agents as described above.

The aqueous copolymer dispersions according to the invention are used, for example, as binders in pigment-containing, aqueous preparations which serve for the coating of substrates. These include, for example, synthetic resin-bound renders, tile adhesives, paints, such as, for example, emulsion paints, emulsion finishes and glazes, sealing compounds and sealing compositions, preferably for porous components, but also paper coating slips. Paint formulations may include low emission interior or exterior paints. In the context of using the aqueous copolymer dispersions in coating compositions, a particular feature of the aqueous copolymer dispersions is the ability to have a very good wet scrub resistance even at a high pigment volume concentration (PVC), i.e. in highly filled formulated compositions above the critical PVC. The aqueous copolymer dispersions of the present invention are particularly advantageous as binders in coating formulations for low-emission interior or exterior paints, especially high PVC paints with a binder content between 6% to 20% emulsion having a solid content of 50%, e.g. matt interior paints.

The present emulsions are also suitable for medium to low PVC paints like satin and semi gloss paints.

In one embodiment, the coating composition may comprise from 30 to 90% of at least one filler, from 0.1 to 25% of at least one pigment, and from 5 to 60%, preferably from 5 to 20% of the aqueous copolymer dispersion of the present invention. The coating composition may also comprise one or more selected from the group consisting of defoamers, surfactants, dispersants, biocides, rheology modifiers, freeze-thaw additives, and thickeners.

The copolymer dispersions as hereinbefore described may be combined with filler material, additional water and/or any optional other ingredients, such as one or more auxiliaries, to form the aqueous coating compositions herein. The solids content of the aqueous compositions so formed will generally range from about 30 wt. % to about 75 wt. % of the total composition. More preferably, the solids content of the aqueous coating compositions herein will range from about 40 wt. % to about 65 wt. % of the total composition. These are to be understood as meaning all constituents of the preparation except for water, but at least the total amount of solid binder, filler, pigment, plasticizer and polymeric auxiliaries.

The pigment volume concentration (PVC) of the pigment-containing, aqueous preparations according to the invention is in general above 5%, preferably in the range from 10 to 90%. In particularly preferred embodiments, the PVCs are either in the range from 10 to 45% or in the range from 60 to 90%, in particular from 70 to 90%.

Pigments which may be used are all pigments known to the person skilled in the art for said intended use. Preferred pigments for the aqueous preparations according to the invention, preferably for emulsion paints, are, for example, titanium dioxide, preferably in the form of rutile, barium sulfate, zinc oxide, zinc sulfide, basic lead carbonate, antimony trioxide and lithopone (zinc sulfide and barium sulfate). The aqueous preparations may also contain colored pigments, for example iron oxides, carbon black, graphite, luminescent pigments, zinc yellow, zinc green, ultramarine, manganese black, antimony black, manganese violet, Paris blue or Schweinfurt green. In addition to the inorganic pigments, the preparations according to the invention may also contain organic colored pigments, for example sepia, gamboge, Cassel brown, toluidine red, para red, Hansa yellow, indigo, azo dyes, anthraquinoid and indigoid dyes and dioxazine, and quinacridone, phthalocyanine, isoindolinone and metal complex pigments.

Fillers which may be used are all fillers known to the person skilled in the art for said intended use. Preferred fillers are aluminosilicates, such as, for example, feldspars, silicates, such as, for example, kaolin, talc, mica, magnesite, alkaline earth metal carbonates, such as, for example, calcium carbonate, for example in the form of calcite or chalk, magnesium carbonate, dolomite, alkaline earth metal sulfates, such as, for example, calcium sulfate, and silica. The fillers can be used either as individual components or as filler mixtures. Filler mixtures, such as, for example, calcium carbonate/kaolin and calcium carbonate/talc, are preferred in practice. Synthetic resin-bound renders may also contain relatively coarse aggregates, such as sands or sandstone granules. In general, finely divided fillers are preferred in emulsion paints.

In order to increase the hiding power and to save white pigments, finely divided fillers, such as, for example, precipitated calcium carbonate or mixtures of different calcium carbonates having different particle sizes, are preferably frequently used in emulsion paints. Mixtures of colored pigments and fillers are preferably used for adjusting the hiding power of the hue and the depth of color.

The customary auxiliaries include wetting agents or dispersants, such as sodium, potassium, or ammonium polyphosphates, alkali metal and ammonium salts of polyacrylic acids and of polymaleic acid, polyphosphonates, such as sodium 1-hydroxyethane-1,1-diphosphonate, and naphthalenesulfonic acid salts, in particular sodium salts thereof. In addition, suitable amino alcohols, such as, for example, 2-amino-2-methylpropanol, may be used as dispersants. The dispersants or wetting agents are preferably used in an amount of from 0.1 to 2% by weight, based on the total weight of the emulsion paint.

Furthermore, the auxiliaries may also comprise thickeners, for example cellulose derivatives, such as methylcellulose, hydroxyethylcellulose and carboxymethylcellulose, and furthermore casein, gum Arabic, tragacanth gum, starch, sodium alginate, polyvinyl alcohol, polyvinylpyrrolidone, sodium polyacrylates, water-soluble copolymers based on acrylic and (meth)acrylic acid, such as acrylic acid/acrylamide and (meth)acrylic acid/acrylic ester copolymers and so-called associative thickeners, such as styrene/maleic anhydride polymers or preferably hydrophobically modified polyetherurethanes (HEUR) known to the person skilled in the art, hydrophobically modified acrylic acid copolymers (HASE) polyetherpolyols. Inorganic thickeners, such as, for example, bentonites or hectorite, may also be used. The thickeners are preferably used in amounts of from 0.1 to 3% by weight, particularly preferably from 0.1 to 1% by weight, based on the total weight of the aqueous preparation.

In addition, waxes based on paraffins and polyethylene, and dulling agents, antifoams, preservatives and water repellents, biocides, fibers and further additives known to the person skilled in the art may also be used as auxiliaries in the aqueous preparations according to the invention.

The dispersions according to the invention can be used to produce not only solvent- and plasticizer-free preparations but also coating systems which contain solvents and/or plasticizers as film formation auxiliaries. Film formation auxiliaries are generally known to the person skilled in the art and can be used generally in amounts of from 0.1 to 20% by weight, based on the vinyl ester copolymer present in the preparation, so that the aqueous preparation has a minimum film formation temperature of less than 15° C., preferably in the range from 0° C. to 10° C. The use of these film formation auxiliaries is not necessary in view of the advantageous properties of the plastic dispersions according to the invention. In a preferred embodiment, the aqueous preparations according to the invention therefore contain no film formation auxiliary. The coating composition may have a minimum film forming temperature of less than or equal to 5° C. without addition of film forming agents.

The aqueous preparations according to the invention are stable fluid systems which can be used for coating a multiplicity of substrates. Consequently, the present invention also relates to methods for coating substrates and to the coating materials themselves. Suitable substrates are, for example, wood, concrete, mineral substrates, metal, glass, ceramics, plastic, renders, wallpapers, paper and coated, primed or weathered substrates. The application of the preparation to the substrate to be coated is effected in a manner dependent on the form of the preparation. Depending on the viscosity and the pigment content of the preparation and on the substrate, the application can be effected by means of roll-coating, brushing, knife-coating or as a spray.

EXAMPLES

Comparison A-E:
Preparation of a Dispersion of a Vinyl Acetate-Ethylene Copolymer without Silane (A)

A pressure apparatus with stirrer, jacket heater and metering pumps was charged with an aqueous solution consisting of the following constituents. 25,500 g of water, 80 g of sodium acetate, 1400 g of a 14% solution of a polyvinylalcohol with a degree of saponification of 88% and a viscosity of 23 mPas for a 4% solution, 1400 g of a 70% by weight aqueous solution of an oxoalkyl ethoxylate with 28 mol of ethylene oxide, 1100 g of an 15% by weight solution of sodium dodecyl sulphate, 550 g of a 30% by weight aqueous sodium vinylsulfonate solution, 13 g of sodium meta bisulphite, and 7 g of a 1% by weight aqueous solution of Fe(II) ((SO$_4$)×7 H$_2$O. The apparatus was freed of atmospheric oxygen and ethylene was injected into the apparatus up to ethylene pressure 20 bar. 2900 g of vinyl acetate were then metered in. The mixture was heated to internal temperature 65° C. Reaching 35° C., a solution of 74 g of sodium persulphate in 600 g of water was metered in within 30 min. When the reaction mixture reaches 60° C. the ethylene pressure is set to 36 bar which is kept until a total ethylene amount of 4100 g is added. When 65° C. and a pressure of 36 bar are reached, a mixture of 26,500 g of vinyl acetate was metered in over 200 minutes. During the last 30 min of the monomer addition the reactor temperature is raised to 85° C. and another solution of sodium persulphate (35 g in 590 g of water) are added. To finalize the reaction the temperature of 85° C. is kept for one hour before cooling.

The emulsion obtained by this procedure, as shown in Table 1 below, has a solids content of 53.8%, a pH of 4.5 and a viscosity of 5660 mPas. The emulsion polymer has a Tg of 10° C.

Additional comparative examples that contained glycidylmethacrylate (GMA) and/or functional group containing silanes, such as vinyltriethoxysilane (Geniosil GF 56 from Wacker Chemical) or 3-glycidoxypropyl-triethoxysilane (Silane KBE 403 from Shinetsu), were prepared and the emulsion results are shown in Table 1.

Examples 1-6

Preparation of a Dispersion of a Vinyl Acetate-Ethylene Copolymer Using Tetraethoxysilane and GMA (Example 1)

A pressure apparatus with stirrer, jacket heater and metering pumps was charged with an aqueous solution consisting of the following constituents. 25,500 g of water, 80 g of sodium acetate, 1400 g of a 14% solution of a polyvinylalcohol with a degree of saponification of 88% and a viscosity of 23 mPas for a 4% solution, 1400 g of a 70% by weight aqueous solution of an oxoalkyl ethoxylate with 28 mol of ethylene oxide, 1100 g of an 15% by weight solution of sodium dodecyl sulphate, 550 g of a 30% by weight aqueous sodium vinylsulfonate solution, 13 g of sodium meta bisulphite, and 7 g of a 1% by weight aqueous solution of Fe(II) ((SO$_4$)×7 H$_2$O. The apparatus was freed of atmospheric oxygen and ethylene was injected into the apparatus up to ethylene pressure 20 bar. 2900 g of vinyl acetate were then metered in. The mixture was heated to internal temperature 65° C. Reaching 35° C., a solution of 74 g of sodium persulphate in 600 g of water was metered in within 30 min. When the reaction mixture reaches 60° C. the ethylene pressure is set to 36 bar which is kept until a total ethylene amount of 4100 g is added. When 65° C. and a pressure of 36 bar are reached, a mixture of 26,500 g of vinyl acetate and 67 g of tetraethoxysilane (for example Silane KBE-04 from Shinetsu) and 330 g of glycidylmethacrylate (GMA) was metered in over 200 minutes. During the last 30 min of the monomer addition the reactor temperature is raised to 85° C. and another solution of sodium persulphate (35 g in 590 g of water) are added. To finalize the reaction the temperature of 85° C. is kept for one hour before cooling.

The emulsion obtained by this procedure has a solids content of 53.9%, a pH of 4.2 and a viscosity of 5100 mPas. The emulsion polymer has a Tg of 10° C.

Additional examples within the present invention that contained glycidylmethacrylate (GMA) and/or silanes, such as methyltriethoxysilane (Silane KBE 13 from Shinetsu), hexyltriethoxysilane (Silane KBE 3063 from Shinetsu), were prepared and the emulsion results are shown in Table 1.

Table 1 shows the emulsion results for Comparative Examples A-E and Example 1-6. GMA and silane are reported in parts per total monomers.

TABLE 1

| Example | GMA | Silane | Silane Type | solid | MFFT °C | Tg °C. | Viscosity mPas | pH |
|---|---|---|---|---|---|---|---|---|
| Comp. A | 0 | 0 | — | 53.8 | 0 | 10 | 5660 | 4.5 |
| Comp. B | 1 | 0 | — | 53.9 | 0 | 11 | 5400 | 4.4 |
| Comp. C | 0 | 0.2 | vinyltriethoxysilane (Geniosil GF 56) | 53.6 | 0 | 10 | 5600 | 4.8 |
| Comp. D | 1 | 0.2 | vinyltriethoxysilane (Geniosil GF 56) | 54 | 0 | 11 | 6200 | 4.2 |
| Comp. E | 1 | 0.2 | 3-glycidoxypropyl-triethoxysilane (KBE 403) | 53.8 | 0 | 12 | 5300 | 4.8 |

TABLE 1-continued

| Example | GMA | Silane | Silane Type | solid | MFFT °C | Tg °C | Viscosity mPas | pH |
|---|---|---|---|---|---|---|---|---|
| 1 | 1 | 0.2 | tetraethoxysilane (KBE 04) | 53.9 | 0 | 10 | 5100 | 4.2 |
| 2 | 1 | 0.2 | methyltriethoxysilane (KBE 13) | 53.6 | 0 | 10 | 5700 | 4.4 |
| 3 | 1 | 0.2 | hexyltriethoxysilane (KBE 3063) | 53.9 | 0 | 11 | 5200 | 4.9 |
| 4 | 0 | 0.2 | tetraethoxysilane (KBE 04) | 54 | 0 | 9 | 6330 | 4.5 |
| 5 | 0 | 0.2 | methyltriethoxysilane (KBE 13) | 54.2 | 0 | 10 | 5950 | 4.6 |
| 6 | 0 | 0.2 | hexyltriethoxysilane (KBE 3063) | 54.1 | 0 | 10 | 6300 | 4.7 |

Example 7

Use Example

The invention is characterized in more detail below by formulation of emulsion paints or emulsion finishes having compositions shown in Table 2 below:

TABLE 2

Emulsion paint having a PVC of 77%

| Constituents | Parts by weight |
|---|---|
| Water | 301.5 |
| Dispersant (sodium polyphosphate, 10% strength solution) | 5.0 |
| Cellulose ether (type MH, high-viscosity) | 4.0 |
| Dispersant, Na salt of a polyacrylic acid | 3.5 |
| Antifoam based on mineral oil | 2.0 |
| 10% strength sodium hydroxide solution | 2.0 |
| Pigment, titanium dioxide | 80.0 |
| Filler, calcium carbonate (particle size 2 μm) | 235.0 |
| Filler, calcium carbonate (particle size 5 μm) | 205.0 |
| Filler, aluminum silicate | 35.0 |
| Copolymer dispersion (adjusted with water to 53% solids)[1] | 125.0 |
| Preservative | 2.0 |

[1] The copolymers of Examples 1 to 6 and Comparative Examples A to E were used (cf. Table 1)

The pulverulent methylhydroxyethylcellulose was sprinkled into the water and dissolved with stirring, after which the solutions of the Na salt of polyacrylic acid and polyphosphoric acid and the 10% strength by weight sodium hydroxide solution were added with stirring. The preservative and the antifoam were added to the viscous solution obtained. First titanium dioxide and then aluminum silicate and the calcium carbonate types were added and dispersed using a high speed stirrer. To investigate the parameters of the copolymer dispersions described, in each case 875 g of the pigment/filler paste was stirred with 125 g of the copolymer dispersion to be tested in each case. Emulsion paints having a solids content of about 53% and having a pigment volume concentration (PVC) of about 77% were obtained.

The wet scrub resistance (WSR) of these paints was tested by means of the nonwoven pad method (ISO 11998).

Table 3 demonstrates the wet scrub resistance according to ISO 11998 as thickness loss in μm (WSR) after 200 cycles, and the corresponding classification according to EN 13300.

TABLE 3

| Ex. | GMA | Silane | Silane Type | WSR ISO 11998 | EN 13300 Class |
|---|---|---|---|---|---|
| A | 0 | 0 | — | 90 μm | IV |
| B | 1 | 0 | — | 25 μm | III |
| C | 0 | 0.2 | vinyltriethoxysilane (Geniosil GF 56) | 45 μm | III |
| D | 1 | 0.2 | vinyltriethoxysilane (Geniosil GF 56) | 14 μm | II |
| E | 1 | 0.2 | 3-glycidoxypropyl-triethoxysilane (KBE 403) | 12 μm | II |
| 1 | 1 | 0.2 | tetraethoxysilane (KBE 04) | 17 μm | II |
| 2 | 1 | 0.2 | methyltriethoxysilane (KBE 13) | 18 μm | II |
| 3 | 1 | 0.2 | hexyltriethoxysilane (KBE 3063) | 11 μm | II |
| 4 | 0 | 0.2 | tetraethoxysilane (KBE 04) | 46 | III |
| 5 | 0 | 0.2 | methyltriethoxysilane (KBE 13) | 42 | III |
| 6 | 0 | 0.2 | hexyltriethoxysilane (KBE 3063) | 47 | III |

The measured values of the wet scrub resistance of the emulsion paints produced using a dispersion according to the invention (Examples 1-6) clearly show that a substantial improvement in the WSR can be achieved in comparison with emulsion paints produced using a dispersion having no functionalization (Comparative A) Surprisingly the inventive non functionalized silane compounds resulted in the same performance compared to reactive silanes (Comparison B, D, E vs. examples 1-3, Comparison C, examples 4-6)

What is claimed is:
1. An aqueous copolymer dispersion comprising at least one copolymer formed from a mixture comprising:
(a) one or more main monomers selected from the group consisting of vinyl esters of $C_1$-$C_{18}$ alkanoic acids, vinyl esters of aromatic acids, α-olefins, dienes, esters of ethylenically unsaturated carboxylic acids, vinylaromatics, and vinylhalogenides;
(b) from 0.05 to 5% by weight of one or more silicon containing compounds having the formula $(R^1)_n$—Si—$(OR^2)_{4-n}$, wherein n is 0, 1, 2, or 3, and $R^1$ and $R^2$ are each independently a $C_1$-$C_{15}$ alkyl, and wherein the one or more silicon containing compounds are substantially free of any reactive groups selected from the group consisting of mercapto groups, epoxy groups, ethylenically unsaturated groups, glycidyl groups, and amino groups;
(c) from 0 to 5% by weight of one or more oxirane or hydroxyl-containing functional monomers; and

(d) from 0 to 10% by weight of one or more auxiliary monomers different from (a)-(c);

wherein all percents are % by weight based on the total weight of the main monomers in the monomer mixture.

2. The aqueous copolymer dispersion of claim 1, wherein the one or more silicon containing compounds (b) are selected from the group consisting of tetramethoxysilane, tetraethoxysilane, alkyltrimethoxysilanes, alkyltriethoxysilanes, dialkyldimethoxysilane, dialkyldiethoxysilane, trialkylmethoxysilanes, and trialkylethoxysilanes.

3. The aqueous copolymer dispersion of claim 1, wherein the weight percentage of the one or more silicon containing compounds (b) is from 0.1 to 1%.

4. The aqueous copolymer dispersion of claim 1, wherein the one or more oxirane or hydroxyl functional monomers (c) are selected from the group consisting of hydroxy ethyl methacrylate, glycidyl methacrylate, glycidyl acrylate, allyl glycidyl ether, vinyl glycidyl ether, hydroxy propyl acrylate, hydroxy butyl acrylate, hydroxy ethyl acrylate, hydroxy propyl methacrylate, and mixtures thereof.

5. The aqueous copolymer dispersion of claim 1, wherein the weight percentage of the one or more oxirane or hydroxyl functional monomers (c) is from 0.5 to 3%.

6. The aqueous copolymer dispersion of claim 1, wherein the one or more auxiliary monomers (d) are selected from the group consisting of unsaturated sulfonic acids or their salts, ethylenically unsaturated carboxylic acids, ethylenically unsaturated carboxylic acid amides, ethylenically unsaturated phosphonic acids or their salts, acetylacetoxy group containing monomers, and ethylenically unsaturated ethylene urea derivatives.

7. The aqueous copolymer dispersion of claim 1, wherein the weight percentage of the one or more auxiliary monomers (d) is from 0.05 to 5%.

8. The aqueous copolymer dispersion of claim 1, wherein a weight ratio of one or more silicon containing compounds (b) to the one or more oxirane or hydroxyl functional monomers (c) is from 1:2 to 1:20.

9. The aqueous copolymer dispersion of claim 1, wherein the one or more main monomers (a) comprise from 60 to 95% of at least one vinyl ester of a $C_1$-$C_{18}$ alkanoic acid and from 5 to 40% of at least one α-olefin.

10. The aqueous copolymer dispersion of claim 9, wherein the at least one vinyl ester is vinyl acetate and the at least one α-olefin is ethylene.

11. The aqueous copolymer dispersion of claim 10, wherein the one or more main monomers (a) further comprise at least one vinyl ester of a saturated, branched monocarboxylic acid having 9, 10 or 11 carbon atoms in the acid radical.

12. A coating composition comprising:
at least one filler;
at least one pigment;
one or more selected from the group consisting of defoamers, surfactants, dispersants, biocides, rheology modifiers, freeze-thaw additives, and thickeners; and
an aqueous copolymer dispersion comprising at least one copolymer formed from a mixture comprising:
(a) one or more main monomers selected from the group consisting of vinyl esters of $C_1$-$C_{18}$ alkanoic acids, vinyl esters of aromatic acids, α-olefins, dienes, esters of ethylenically unsaturated carboxylic acids, vinylaromatics, and vinylhalogenides;
(b) from 0.05 to 5.0% by weight of one or more silicon containing compounds having the formula $(R^1)_n$—Si—$(OR^2)_{4-n}$, wherein n is 0, 1, 2, or 3, and $R^1$ and $R^2$ are each independently a $C_1$-$C_{15}$ alkyl, and wherein the one or more silicon containing compounds are substantially free of any reactive groups selected from the group consisting of mercapto groups, epoxy groups, ethylenically unsaturated groups, glycidyl groups, and amino groups;
(c) from 0 to 5% by weight of one or more oxirane or hydroxyl-containing functional monomers; and
(d) from 0 to 10% by weight of one or more auxiliary monomers different from (a)-(c);
wherein all percents are % by weight based on the total weight of main monomers in the monomer mixture.

13. The coating composition of claim 12, wherein the weight percentage of the at least one filler is from 30 to 90% of the total composition.

14. The coating composition of claim 12, wherein the weight percentage of the at least one pigment is from 0.1 to 25% of the total composition.

15. The coating composition of claim 12, wherein the weight percentage of the aqueous copolymer dispersion is from 5 to 60% of the total composition.

16. The coating composition of claim 15, having a wet scrub class III, II or I according to EN 13300.

17. The coating composition of claim 15, having a loss of thickness of less than 20 μm after 200 cycles, according to ISO 11998:2006.

18. A low emission interior or exterior paint comprising at least one pigment and a binder comprising an aqueous copolymer dispersion comprising at least one copolymer formed from a mixture comprising:
(a) one or more main monomers selected from the group consisting of vinyl esters of $C_1$-$C_{18}$ alkanoic acids, vinyl esters of aromatic acids, α-olefins, dienes, esters of ethylenically unsaturated carboxylic acids, vinylaromatics, and vinylhalogenides;
(b) from 0.05 to 5% by weight of one or more silicon containing compounds having the formula $(R^1)_n$—Si—$(OR^2)_{4-n}$, wherein n is 0, 1, 2, or 3, and $R^1$ and $R^2$ are each independently a $C_1$-$C_{15}$ alkyl, and wherein the one or more silicon containing compounds are substantially free of any reactive groups selected from the group consisting of mercapto groups, epoxy groups, ethylenically unsaturated groups, glycidyl groups, and amino groups;
(c) from 0 to 5% by weight of one or more oxirane or hydroxyl-containing functional monomers; and
(d) from 0 to 10% by weight of one or more auxiliary monomers different from (a)-(c);
wherein all percents are % by weight based on the total weight of the main monomers in the monomer mixture.

19. An aqueous copolymer dispersion comprising at least one copolymer formed from a mixture comprising:
(a) one or more main monomers selected from the group consisting of vinyl esters of $C_1$-$C_{18}$ alkanoic acids, vinyl esters of aromatic acids, α-olefins, dienes, esters of ethylenically unsaturated carboxylic acids, vinylaromatics, and vinylhalogenides;
(b) from 0.05 to 5% by weight of one or more silicon containing compounds having the formula $(R^1)_n$—Si—$(OR^2)_{4-n}$, wherein n is 0, 1, 2, or 3, and $R^1$ and $R^2$ are each independently a $C_1$-$C_{15}$ alkyl, and wherein the one or more silicon containing compounds are substantially free of any reactive groups selected from the group consisting of mercapto groups, epoxy groups, ethylenically unsaturated groups, glycidyl groups, and amino groups;
(c) from 0.05 to 5% by weight of one or more oxirane or hydroxyl-containing functional monomers; and
(d) from 0 to 10% by weight of one or more auxiliary monomers different from (a)-(c);

wherein all percents are % by weight based on the total weight of the main monomers in the monomer mixture.

* * * * *